United States Patent
Fredrickson et al.

(10) Patent No.: US 8,973,733 B2
(45) Date of Patent: Mar. 10, 2015

(54) ARTICLE ORIENTER AND ATTENDANT ORIENTATION OPERATIONS

(71) Applicant: Douglas Machine Inc., Alexandria, MN (US)

(72) Inventors: Lee A. Fredrickson, Saint Cloud, MN (US); Shawn P. Pundsack, Freeport, MN (US); Irvan L. Pazdernik, Alexandria, MN (US)

(73) Assignee: Douglas Machine Inc., Alexandria, MN (US)

(*) Notice: Subject to any disclaimer, the term of this patent is extended or adjusted under 35 U.S.C. 154(b) by 33 days.

(21) Appl. No.: 13/734,356

(22) Filed: Jan. 4, 2013

(65) Prior Publication Data
US 2014/0014469 A1    Jan. 16, 2014

Related U.S. Application Data

(60) Provisional application No. 61/582,976, filed on Jan. 4, 2012.

(51) Int. Cl.
*B65G 43/08*    (2006.01)
*B65G 47/24*    (2006.01)
*B65B 35/00*    (2006.01)

(52) U.S. Cl.
CPC ............... *B65G 47/24* (2013.01); *B65B 35/00* (2013.01)
USPC .......................................... 198/401; 198/395

(58) Field of Classification Search
CPC ...... B65G 47/22; B65G 47/24; B65G 47/244; B65G 47/2445; B65G 47/248; B65G 47/252
USPC .......... 198/401, 411, 415, 416, 382, 394, 395
See application file for complete search history.

(56) References Cited

U.S. PATENT DOCUMENTS

| | | | | |
|---|---|---|---|---|
| 3,415,350 A | * | 12/1968 | Murphy | 198/394 |
| 3,451,523 A | * | 6/1969 | Evans, Jr. et al. | 198/394 |
| 3,618,743 A | * | 11/1971 | Benatar et al. | 198/384 |
| 4,816,668 A | * | 3/1989 | Williams et al. | 250/223 B |
| 4,934,510 A | * | 6/1990 | Lutgendorf | 198/461.3 |
| 5,058,724 A | * | 10/1991 | Hinton | 198/376 |
| 5,919,028 A | * | 7/1999 | Edqvist | 414/754 |
| 7,798,308 B2 | * | 9/2010 | Ranger | 198/415 |
| 8,429,989 B2 | * | 4/2013 | Raupp | 73/865.8 |
| 2011/0108389 A1 | * | 5/2011 | Bonnain | 198/384 |

OTHER PUBLICATIONS

AFA Systems Inc., HD Cartoner—Heavy Duty Cartoner Flyer, 2011.

* cited by examiner

*Primary Examiner* — William R Harp
(74) *Attorney, Agent, or Firm* — Nawrocki, Rooney & Sivertson, P.A.

(57) ABSTRACT

An article inspection and orientation adjustment assembly is generally provided. The assembly is generally characterized by a primary subassembly operatively linked for travel with a secondary subassembly. The primary subassembly includes a vision system for visually inspecting conveyed articles, and an array of actuators, actuators thereof responsive to detections of the vision system and selectively energizable for conveyed article engagement in furtherance of altering an orientation of the conveyed article. The secondary subassembly includes a friction bar extending along a travel path for the conveyed articles, energization of an actuator of the array of actuators resulting in frictional engagement of an actuated article with the friction bar so as to rotatingly orient the actuated article.

18 Claims, 7 Drawing Sheets

ARTICLE ORIENTER AND ATTENDANT ORIENTATION OPERATIONS

This is a United States national patent application filed pursuant to 35 USC §111(a) claiming priority under 35 USC §120 of/to U.S. Pat. Appl. Ser. No. 61/582,976 filed Jan. 4, 2012 and entitled ARTICLE ORIENTER & ATTENDANT ORIENTATION OPERATIONS, the disclosure of which is hereby incorporated by reference in its entirety.

TECHNICAL FIELD

The present invention generally relates to an article orienter, more particularly, to a mechanism, or assembly/system so characterized, for automated visual article inspection or, such inspection and article manipulation in furtherance of selectively orienting the article, for instance, in advance of packaging the article, as well as operations associated with such article orientation in advance of article packaging.

BACKGROUND OF THE INVENTION

For some packaged articles, whether individual or grouped, a select and/or particular orientation relative to the package, e.g., case, carton, etc., is believed advantageous, or even necessary. By way of non-limiting example, particular label content of the article may be intended for consumer viewing via a carton adaptation which defines a viewing "window" or the like. Thus, in advance of carton formation and article housing or retention therein, a check or inspection of the article orientation is desirable to properly or advantageously place/position the article in relation to the carton for same, e.g., a article may be rotated about an axis of elongation so as to "present" what is intended to be readily discernable indicia for/of the packaged article to a consumer or the like. To the extent that an unacceptable orientation is detected, article manipulation is undertaken until an acceptable orientation is obtained.

While article inspection, via a vision system, and manipulation/orientation, e.g., rotation via a powered belt for article engagement, is known and commercially practiced, it is generally believed that such systems are less than advantageous owing to a general cumbersomeness, less than stellar throughputs, a lack of precision and maintenance difficulties/maintenance frequency rates resulting in unplanned and unwanted processing line downtime. Thus, it is believed desirable and advantageous to rethink the current approach to article inspection and manipulation, and to provide an elegant, precise, high throughput operation characterized by a novel device, apparatus, or assembly characterized by initial article observation, and manipulation responsive to a detected status, condition, or orientation, or lack of any one of same, with continued constant or intermittent observation or inspection.

SUMMARY OF THE INVENTION

An article inspection and orientation adjustment assembly is generally provided. The assembly is generally characterized by a primary subassembly operatively linked for travel with a secondary subassembly. The primary subassembly includes a vision system for visually inspecting conveyed articles, and an array of actuators, actuators thereof responsive to detections of the vision system and selectively energizable for conveyed article engagement in furtherance of altering an orientation of the conveyed article. The secondary subassembly includes a friction bar extending along a travel path for the conveyed articles, energization of an actuator of the array of actuators resulting in frictional engagement of an actuated article with the friction bar so as to rotatingly orient the actuated article.

It is contemplated that the subject article inspection and orientation adjustment assembly stand alone, or be part-and-parcel of a larger processing system or line. For example, article inspection and orientation adjustment operations may be advantageously undertaken subsequent to threshold or preliminary article manipulation operations, for the sake of non-limiting illustration, operations such as metering and/or flight bucketing. Moreover, downstream operations such as inspected article packaging, cartoning, etc. is likewise contemplated. More specific features and advantages obtained in view of those features will become apparent with reference to the drawing figures and DETAILED DESCRIPTION OF THE INVENTION.

DETAILED DESCRIPTION OF THE INVENTION

Figure 1:
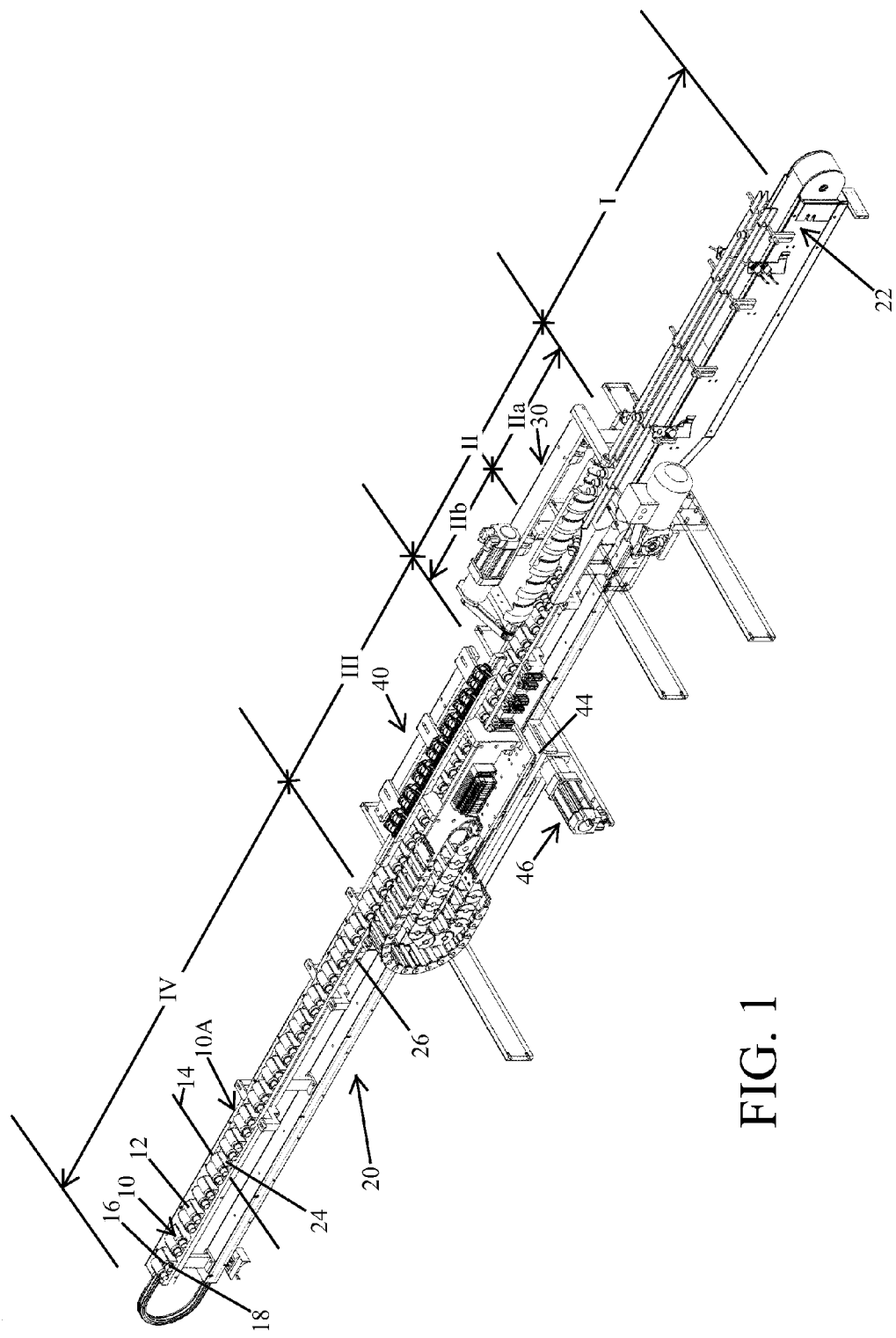
FIG. 1 depicts, in perspective view, process flow right to left, an illustrative processing line for selectively orienting articles characterized by process segments/stations I-IV as indicated, namely, article ingress (I), initial article manipulations (II), article inspection or article inspection and orientation adjustment (III), and inspected article egress (IV)

An advantageous, non-limiting processing line is generally depicted in FIG. 1. For the sake of non-limiting context, the processing of cylindrical containers, namely, elongate cylindrical containers 10 characterized by a body 12, an axis of elongation 14, a shoulder 16 and a capped neck or end 18 are generally shown (e.g., FIGS. 2 & 7), with paired and oriented grouping contemplated in advance of packaging the paired and oriented containers. In advance of a discussion of process line and/or processing particulars, a general immediate overview of the processing line and drawings will facilitate same.

Conveyed article processing as depicted in relation to processing line 20 of FIG. 1 commences figure right, segment or station I, article ingress, and concludes figure left, segment or station IV, grouped and oriented article egress. Initial article manipulations are undertaken in/at segment or station II, with grouped article inspections and, as warranted, article orientation adjustment undertaken in/at segment or station III.

Figure 2:
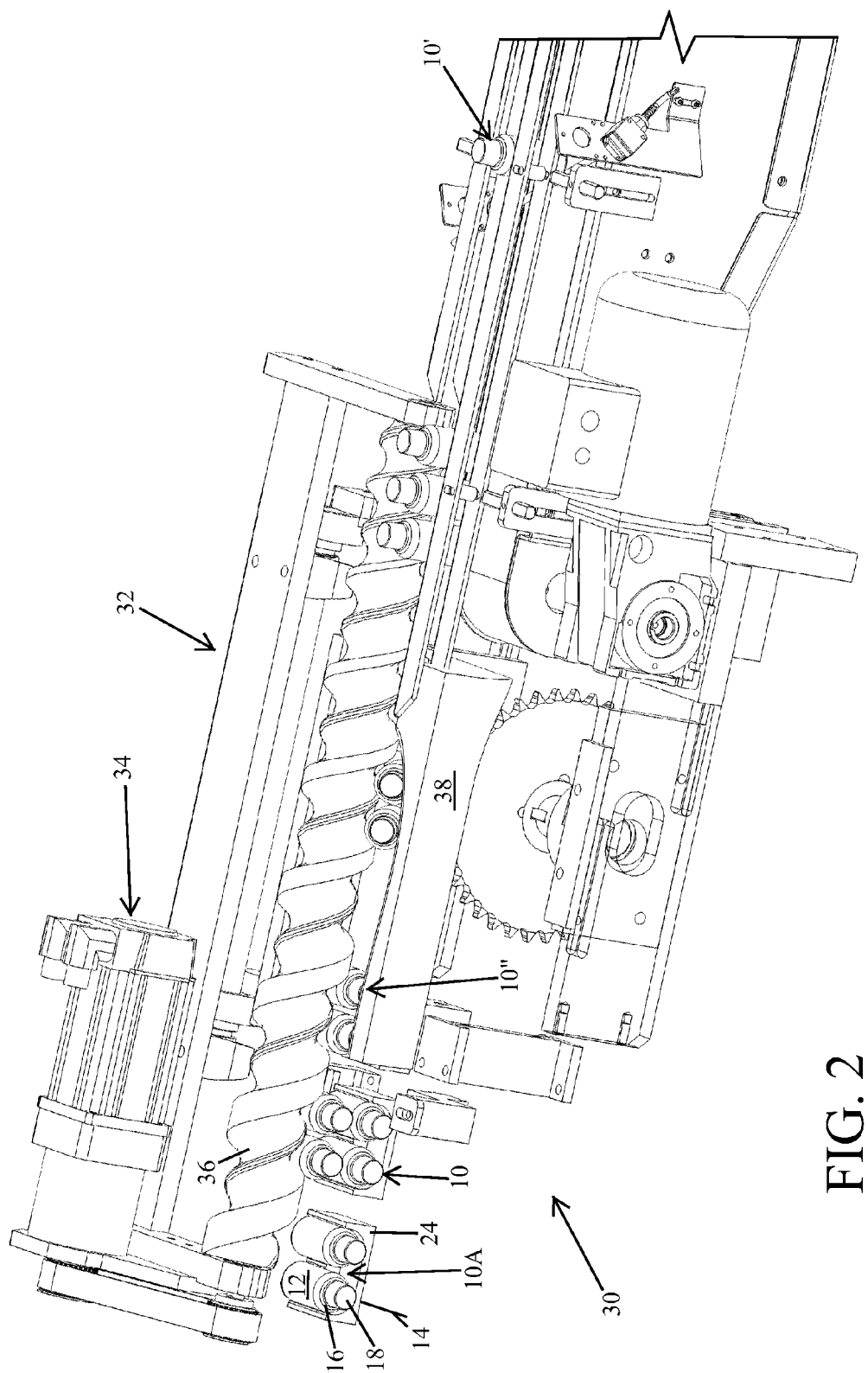
FIG. 2 depicts a detailed view of operations attendant to segments I & II of the processing line of FIG. 1 wherein initial article manipulations are undertaken and/or executed in section II, namely, vertical to horizontal article positioning (IIA) and article collating/grouping (IIB)

As to the initial manipulations, articles 10 may preliminarily be positioned (i.e., repositioned (IIA)), for example and as shown via a handler assembly 30, so as to assume a horizontal orientation 10" from a vertical, i.e., upright, orientation 10', and/or collated or grouped, in article pairs 10A as shown (FIG. 2), and advantageously transferred to a container or flight bucket 24, i.e., "bucketed" (IIB; FIGS. 1 & 2). Subsequent processing proceeds via an inspection and orientation adjustment assembly 40 (see e.g., FIG. 3, and the alternate views thereof with regard to each of FIGS. 4-6) generally characterized by operatively united primary 50 and secondary 100 subassemblies which jointly and cooperatively engage articles (FIG. 7) requiring an oriented adjustment.

Figure 4:
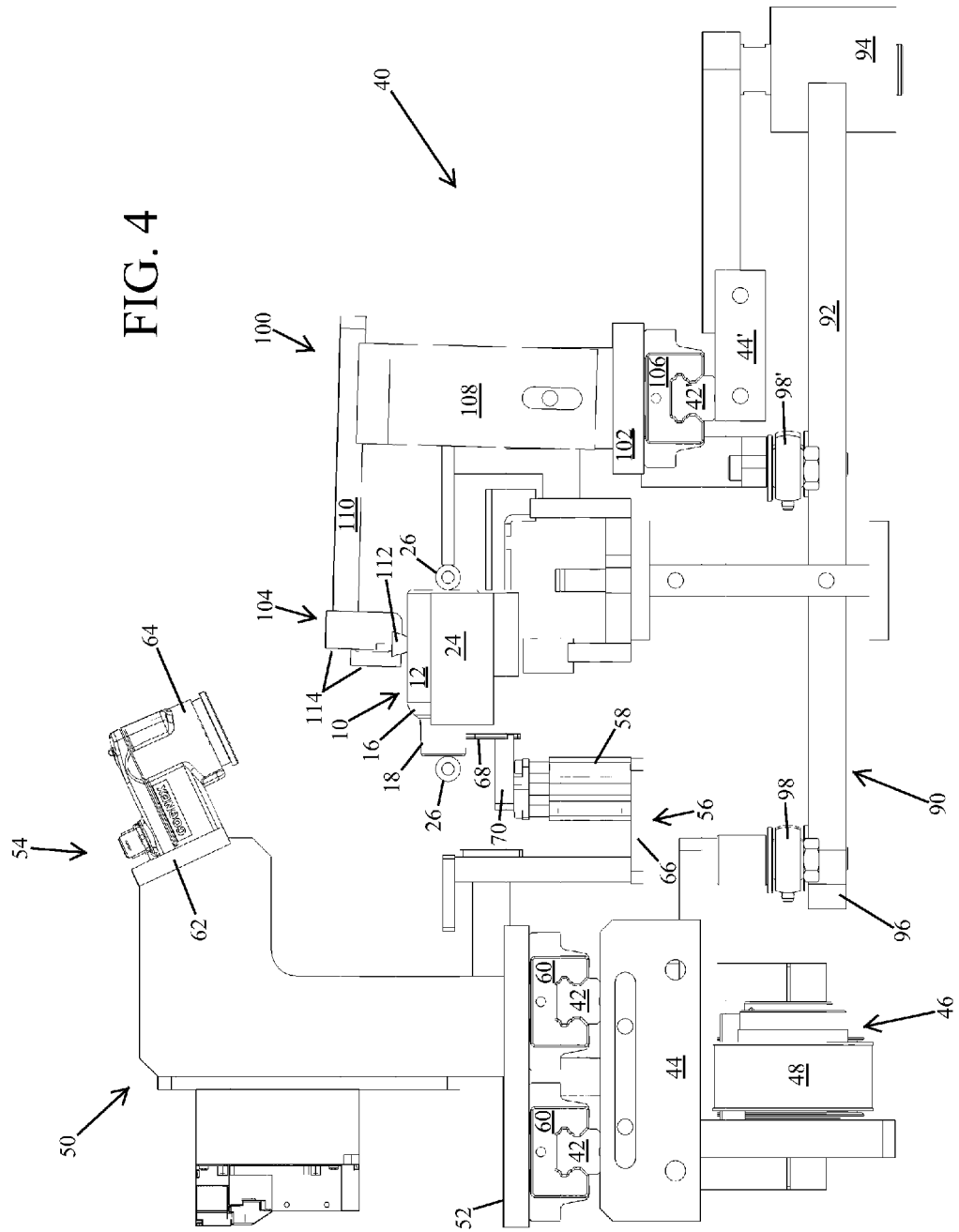
FIG. 4 depicts, upstream end view, the article inspection and orientation adjustment station of FIG. 3.
Figure 5:
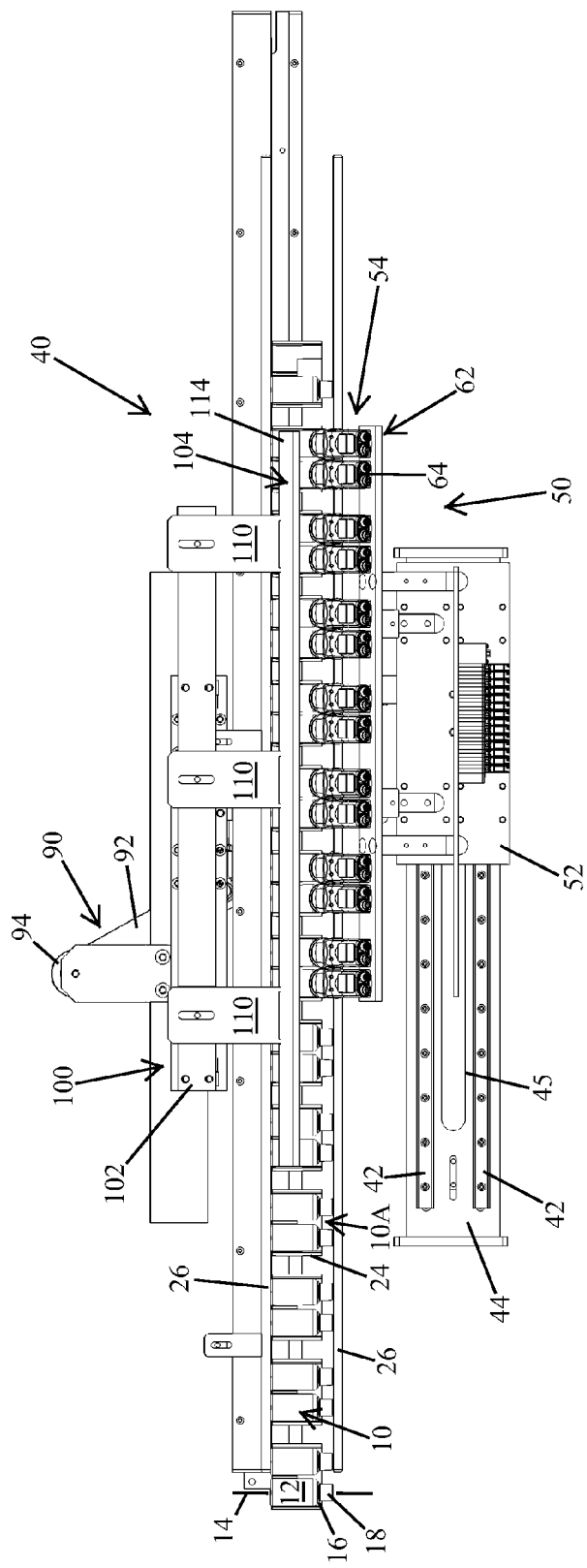
FIG. 5 depicts, overhead plan view, the article inspection and orientation adjustment station of FIG. 3.

Notionally, each article of the conveyed, spaced apart article groups undergo real time inspection with select on-the-fly orientation adjustment (e.g., as by article rotation) via the inspection and orientation adjustment assembly 40 (FIG. 4). The assembly advantageously travels synchronously downstream with a first select set of conveyed article groups, all-the-while inspecting, and, as may be necessary, adjusting via the subassemblies thereof, and thereafter quickly returning to an upstream starting point/locus for inspection and, as circumstances warrant, adjustment of a second select set of conveyed article groups, the second select set immediately adjacent and downstream of the first select set of conveyed article groups.

With general reference to FIGS. 1 & 2, articles 10 are infed via a conveyance system 22 towards and to an initial article manipulation station characterized by handler assembly 30. Handler system 30 generally operates upon the infed articles so as to establish an advantageous article spacing and/or article metering, and a preferred article travel orientation. The system generally includes a selectively driven screw or auger conveyor 32, characterized by a drive assembly 34 and a screw or auger flight 36 axially aligned with the conveyed, ingress articles, and a shoe 38, adjacent and the auger flight 36 and generally intermediate the opposing ends thereof, for receipt of the auger flight metered articles (FIG. 2). Articles 10 are guidingly received by the auger flight 36, metered thereby and subsequently passed to and through the shoe 38 whereby the articles 10 are transitioned from a vertical 10' to a horizontal 10" orientation. Upon exiting the shoe 38 of handler system 30, the metered/paired articles 10A are deposited or otherwise introduced to flight bucket 24, e.g., a compartmentalized bucket (see also FIGS. 3 & 7), for structured retention of an article group (e.g., a pair as shown). As is generally indicated, and advantageously as will become apparent as this disclosure proceeds, bodies 12 of the articles 10 are generally seated within the bucket compartments, with a portion of the capped necks 18 thereof extending beyond the "depth" of the bucket 24 (see e.g., FIG. 4) for, as circumstances warrant, manipulation in furtherance of article orientation adjustment at/within process segment or station III.

Figure 3:
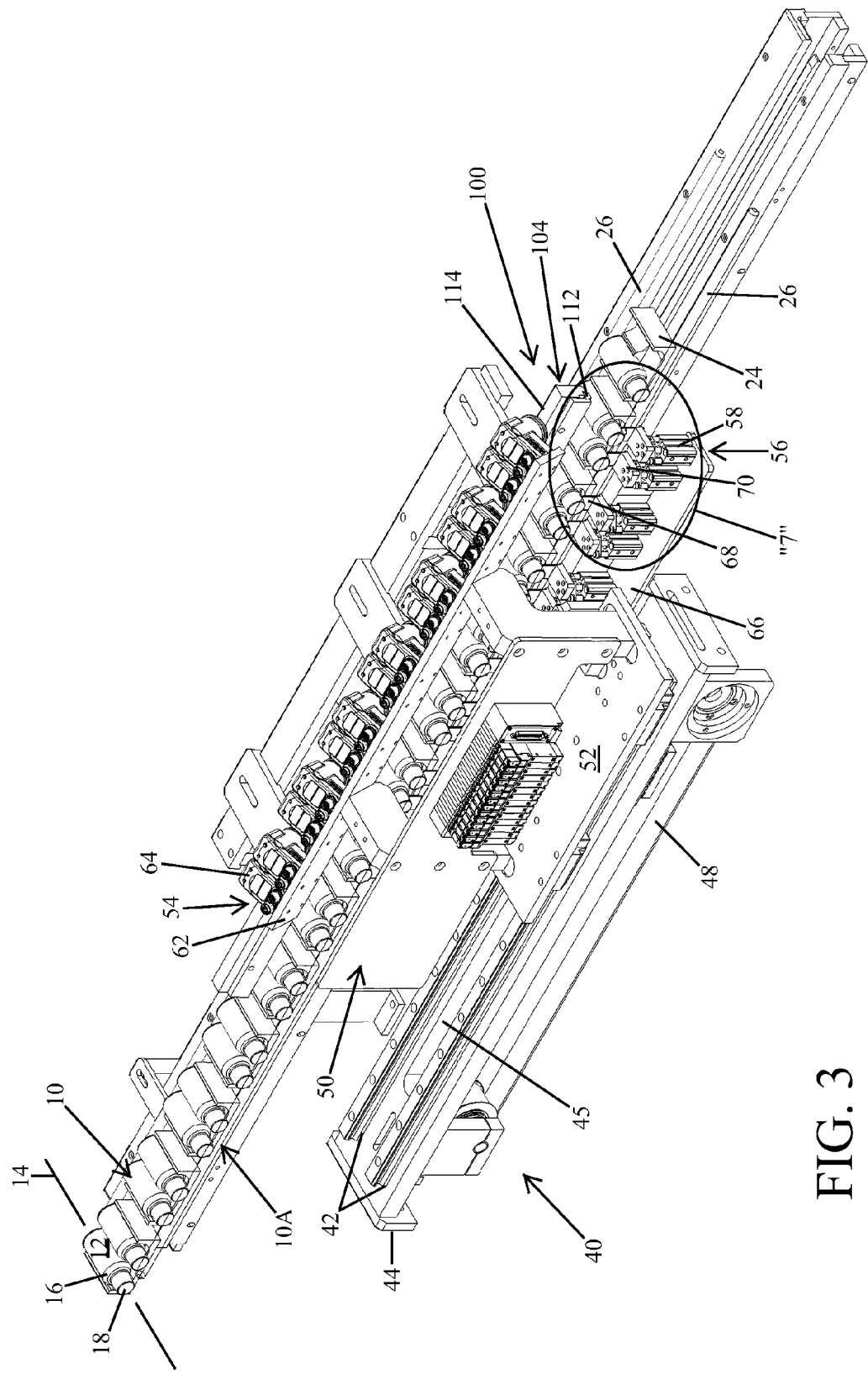
FIG. 3 depicts, in isolation and with select structures omitted for the sake of clarity, article inspection and orientation adjustment station III of the processing line of FIG. 1, article flow generally right to left.

Referring now to FIG. 3, and selectively to the particulars of FIGS. 4-7, there is generally shown preferred, non-limiting inspection and orientation assembly 40. Primary 50 (i.e., directly driven) and secondary 100 (i.e., indirectly driven) subassemblies, operatively linked via a linkage 90 are generally contemplated for the assembly 40 (FIG. 4), the metered/bucketed article groups 10A conveyed therebetween as indicated, more particularly, guidingly conveyed between opposingly paired article guides 26. As previously noted, the assembly is selectively translatable relative to the conveyed articles groups.

As will be subsequently detailed, primary subassembly 50 is generally characterized by a base, e.g., a carriage 52 as shown, a vision system 54, and a series of spaced apart actuators, e.g., an array of "lifters" 56 as shown, for selectively tilting bucketed articles, with secondary subassembly 100 generally characterized by a base, e.g., a carriage 102 as shown, a "friction" bar assembly 104 for select engagement with an article body 12 during tilting of a bucketed article. The linkage 90, more particularly, its inherent configuration, geometry, and dimensions, along with the relationship of elements thereof with, to, among and between elements of each of the subassemblies 50, 100 of inspection and orientation assembly 40 is such that for a given time interval "t," the distance traveled for the secondary subassembly ("d") is less than the distance traveled for the primary subassembly ("D"), advantageously, but not necessarily, "d" is about one half "D" so as to impart a frictional engagement for and between a tilted article body and a contact element of the friction bar so as to effectuate a rate of article adjustment, via rotation, which is easily and readily detected/detectable via the optics of the vision system and/or combined optics and actuator control of the primary subassembly.

Primary subassembly 50 of the inspection and orientation assembly 40 includes vision system 54 and the actuator, i.e., lifter, array 56, each of which are supported by primary carriage 52 and which are in operative communication (i.e., lifters of the lifter array are operatively responsive to detections of the vision system). Carriage 52, as indicated, is adapted to include a component of a track and track guide system, namely, a pair of track guides 60 which operatively receive a pair of spaced apart tracks 42 of a base 44 of a drive assembly 46. Carriage 52 is operatively engaged with a driven belt 48 of drive assembly 46 for translation relative to drive assembly base 44 via slot 45 therein/therethrough (FIG. 3).

Vision system 54 generally comprises an array 62 of spaced apart and grouped optical devices 64, e.g., those supplied by Cognex (Natick, MA, USA) and in the form of a lens and image sensor combination, supported in relation to primary carriage 52. Each optical device group of the vision system is in overlying registration with a corresponding bucketed article group of the bucketed article groups (see e.g., either of FIG. 4 or 5).

Lifter array 56 generally comprises spaced apart groups (e.g., pairs as shown, see e.g., FIG. 3 or 7) of actuators, namely, air cylinders 58 as indicated. Cylinders 58 are pneumatically driven in response to a select detected (or undetected/non-detected) condition of the article in sight of an optic detector/reader 64 of vision system 54. For example, and as contemplated in the present application/process, label indicia of each article of the bucketed articles is to be inspected, more particularly, to the extent that select label indicia or the like is absent from a "present" article orientation view, the article lifter is activated in furtherance of altering the article orientation.

Figure 7:
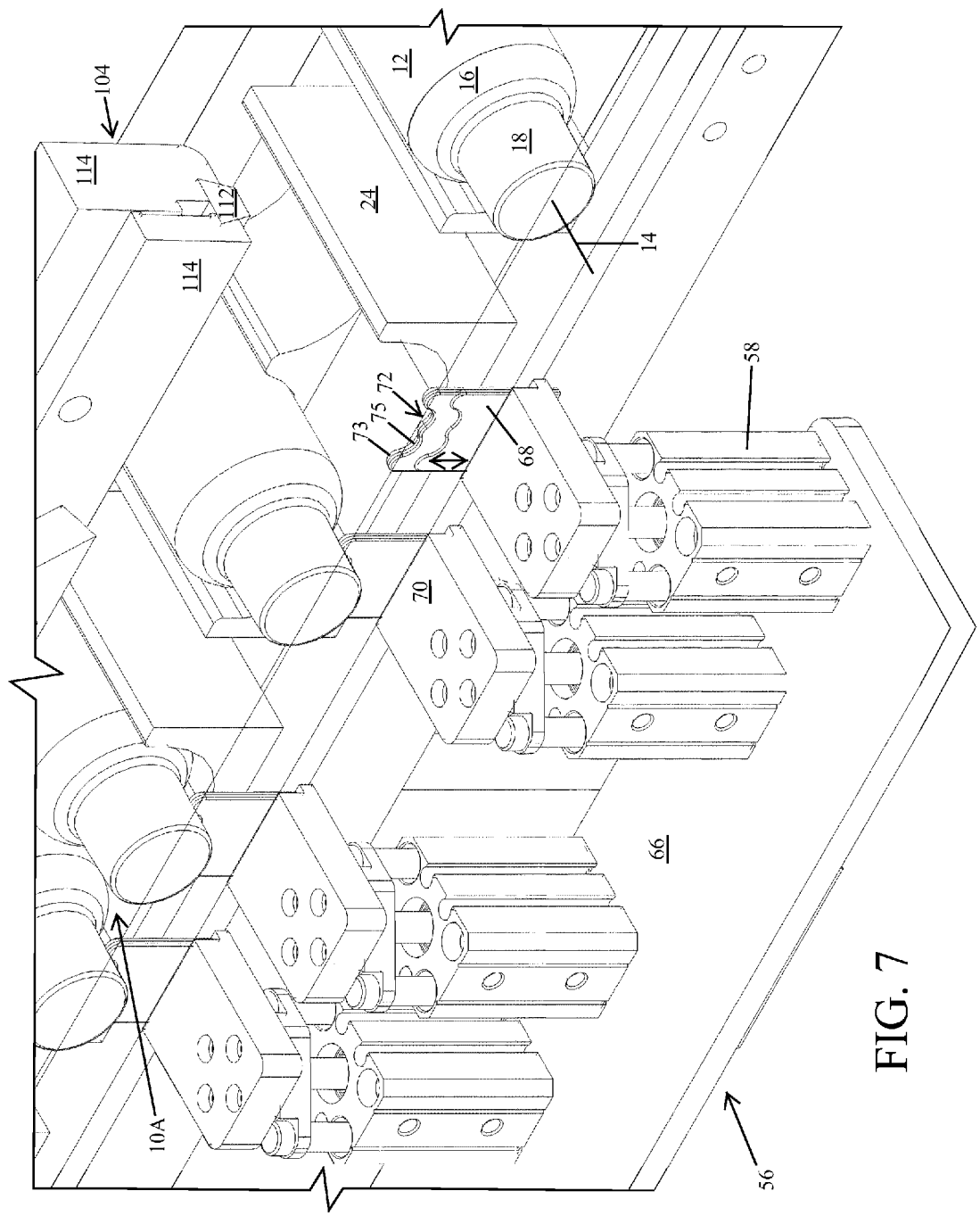

As is best appreciated with reference to FIGS. 3, 4 & 7, lifter array 56 further and generally includes a base 66, upon which actuators 58 are supported, with each actuator 58 equipped with an article engaging member 68 supported by a driven plate 70 or the like. Contemplated interfaces between and among these elements are via conventional mechanical hardware. Article engaging member 68, advantageously as shown FIG. 7, includes a periphery 72 characterized by at least one valley, e.g., cup shaped, or, as shown, a sequence of peaks and valleys (e.g., three peaks 73 and two valleys 75 (FIG. 7), i.e., peak/valley/peak/valley/peak), which cradles a portion of the bucketed article, in the context of the instant application, the capped container neck 18, and permits a sought after rotated article adjustment to the extent article tilting via actuator lifting is called for owing to a sensing of the detected (or non-detected) condition via the vision system. As should be, and as is readily and generally appreciated, primary subassembly 50 is characterized by structural elements depending at least indirectly from carriage 52 thereof so as to selectively support and position each of vision system 54 and lifter array 56 in relation to the conveyed/passing bucketed articles (FIG. 4).

Secondary subassembly 100 (e.g., FIG. 4), as previously noted, generally includes carriage 102 and friction bar assembly 104 supported thereby. As the case with primary subassembly 50, carriage 102 of secondary subassembly 100, as indicated, is adapted to include a component of track and track guide system, namely, a track guide 106 which operatively receives a track 42' of a secondary base 44' of drive assembly 46.

Friction bar assembly 104 is advantageously supported by carriage 102 so as to extend thereover and toward primary subassembly 50, as shown (FIGS. 4 & 5), upon a post 108/arm 110 combination. Both post height (FIG. 4) and arm depth (FIG. 5) are advantageously adjustable via a key/keyway adaptation of each of the post 108 and arms 110. Friction bar assembly 104 is advantageously characterized by a friction member or element 112 (FIGS. 4 & 7) which is retained within a frame/frame members 114 and which is generally positioned in a spaced apart condition in relation to bodies 12 of the bucketed articles. As is best appreciated in relation to FIG. 5, friction bar assembly 104, more particularly, friction element 112 overlays nine article buckets while vision system 54, more particularly, optical device array 62 generally overlies a lesser number, namely, seven as shown. Owing to the nature of friction element 112, and its spaced condition in relation to article bodies 12, a tilting of an article 10 results in engagement of the article therewith, and, as secondary subassembly 100 is translating/traveling at a slower rate than the conveyed article buckets 24, rotation of the engaged article and thus an orientated adjustment effectuated, with contact time essentially regulated via the vision system/vision system controller.

Figure 6:
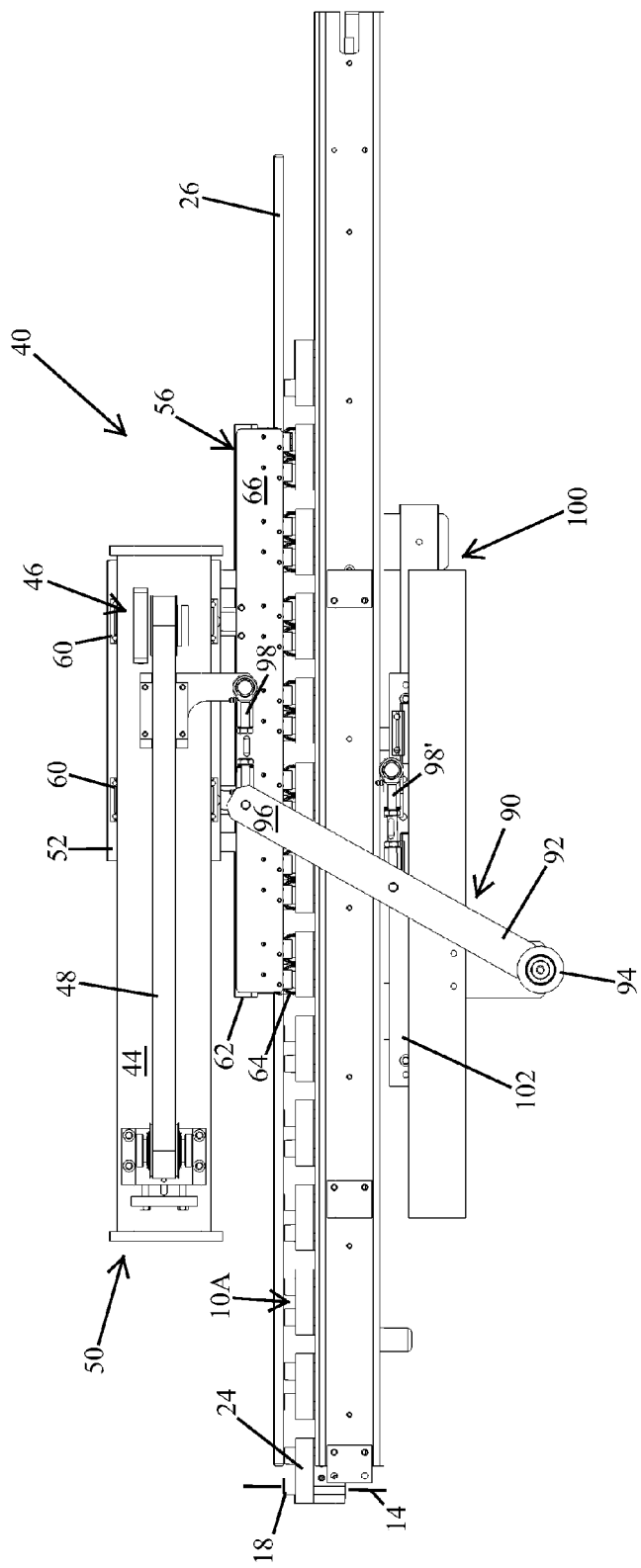
FIG. 6 depicts, below plan view, the article inspection and orientation adjustment station of FIG. 3; and, FIG. 7 depicts area 7 of FIG. 3, enlarged with an article omitted to reveal underlying details.

With reference now to FIG. 4, and particular reference to FIG. 6, linkage 90 is generally shown. Linkage 90 is advantageously characterized by an armature or link bar 92 which is pivotable about an anchored/anchorable end 94 thereof (FIG. 6). A free link bar end 96, opposite the anchored end 94, is united to/with primary assembly carriage 52 via a connecting rod 98. An intermediate portion of link bar 92 is united to/with secondary assembly carriage 102 via a further connecting rod 98'. As previously noted, via the instant advantageous common linkage for and between the subassemblies of the inspection and orientation adjustment assembly, more particularly, a 2:1 armature for the linkage, a translation rate of the secondary subassembly is advantageously about 50% of a translation rate of the primary subassembly. Generally, it is believed advantageous to slave the translation rate of the secondary subassembly to the primary assembly, with the travel rate of the former within an range of about 0.25 to 0.75 of the latter.

Finally, since the structures of the assemblies, subassemblies, and/or mechanisms disclosed herein may be embodied in other specific forms without departing from the spirit or general characteristics thereof, some of which forms have been indicated, the embodiments described and depicted herein/with are to be considered in all respects illustrative and not restrictive. Moreover, while nominal processing has be described and detailed, and to some degree alternate work pieces and systems, assemblies, etc. with regard thereto referenced, contemplated processes are not so limited. Accordingly, the scope of the subject invention is as defined in the language of the appended claims, and includes not insubstantial equivalents thereto.

That which is claimed:

1. An assembly for orienting conveyed articles comprising a primary subassembly operatively linked for travel with a secondary subassembly, said primary subassembly including a vision system and an array of actuators, actuators thereof responsive to detections of said vision system and selectively energizable for conveyed article engagement in furtherance of altering an orientation of the conveyed article, said secondary subassembly characterized by a friction bar extending along a travel path for the conveyed articles, energization of an actuator of said array of actuators resulting in frictional engagement of an actuated article with said friction bar so as to rotatingly orient the actuated article.

2. The assembly of claim 1 wherein said primary subassembly is directly driven for select reversible translation.

3. The assembly of claim 1 wherein said primary subassembly is directly driven for downstream synchronous translation with conveyed articles.

4. The assembly of claim 1 wherein said primary subassembly is directly driven for downstream synchronous translation with conveyed articles, and for upstream translation at a rate greater than downstream translation.

5. The assembly of claim 1 wherein said secondary subassembly is indirectly driven for select reversible translation.

6. The assembly of claim 1 wherein said primary subassembly is directly driven for select reversible translation and said secondary assembly is indirectly driven for select reversible translation, a rate of downstream translation for said secondary subassembly being less than a rate of downstream translation of said primary subassembly.

7. The assembly of claim 1 wherein said primary subassembly is directly driven for select reversible translation and said secondary assembly is indirectly driven for select reversible translation, a rate of downstream translation for said secondary subassembly being about one quarter to three quarters less than a rate of downstream translation of said primary subassembly.

8. The assembly of claim 1 wherein said primary subassembly is directly driven for select reversible translation and said secondary assembly is indirectly driven for select reversible translation, a rate of downstream translation for said secondary subassembly being about one half a rate of downstream translation of said primary subassembly.

9. The assembly of claim 1 further comprising a linkage for operatively uniting said primary subassembly with said secondary subassembly for combined travel of said subassemblies along the travel path for the conveyed articles.

10. The assembly of claim 1 further comprising a linkage for operatively uniting said primary subassembly with said secondary subassembly for combined travel of said subassemblies along the travel path for the conveyed articles, a rate of travel for said secondary subassembly being less than a rate of travel for said primary subassembly.

11. The assembly of claim 1 further comprising a linkage for operatively uniting said primary subassembly with said secondary subassembly for combined travel of said subassemblies along the travel path for the conveyed articles, a rate of travel for said secondary subassembly being about half of a rate of travel for said primary subassembly.

12. The assembly of claim 1 further comprising a linkage for operatively uniting said primary subassembly with said secondary subassembly, said linkage having a first end anchored to a portion of said primary subassembly, a portion of said secondary subassembly anchored to said linkage intermediate opposing ends thereof.

13. The assembly of claim 1 wherein said vision system comprises an optical device array.

14. The assembly of claim 1 wherein said vision system comprises an optical device array characterized by spaced apart groups of optical devices.

15. The assembly of claim 1 wherein said actuators comprise lifters for conveyed article tilting in furtherance of orientation adjustment via a tilted article engagement with said friction bar.

16. The assembly of claim 1 wherein said actuators comprise pneumatic cylinders for conveyed article tilting in furtherance of orientation adjustment via a tilted article engagement with said friction bar.

17. The assembly of claim 1 wherein each actuator of said actuators comprises an article engaging member characterized by a periphery comprised of a valley intermediate two peaks.

18. An assembly for orienting conveyed articles comprising a primary subassembly operatively linked for travel with a secondary subassembly, said primary subassembly including an operative combination of a lens and an image sensor, and an array of actuators, actuators thereof responsive to detections of said vision system and selectively energizable for conveyed article engagement in furtherance of altering an orientation of the conveyed article, said secondary subassembly characterized by a friction bar extending along a travel path for the conveyed articles, energization of an actuator of said array of actuators resulting in frictional engagement of an actuated article with said friction bar so as to rotatingly orient the actuated article.

* * * * *